US011528574B2

(12) United States Patent
Lehnert et al.

(10) Patent No.: US 11,528,574 B2
(45) Date of Patent: Dec. 13, 2022

(54) SUM-DIFFERENCE ARRAYS FOR AUDIO PLAYBACK DEVICES

(71) Applicant: Sonos, Inc., Santa Barbara, CA (US)

(72) Inventors: Hilmar Lehnert, Framingham, MA (US); Paul MacLean, Quincy, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/557,827

(22) Filed: Aug. 30, 2019

(65) Prior Publication Data

US 2021/0067892 A1 Mar. 4, 2021

(51) Int. Cl.

| | |
|---|---|
| ***G06F 17/00*** | (2019.01) |
| ***H04S 7/00*** | (2006.01) |
| ***H04R 1/40*** | (2006.01) |
| ***H04R 3/12*** | (2006.01) |
| ***H04R 5/02*** | (2006.01) |
| ***H04S 3/00*** | (2006.01) |

(52) U.S. Cl.

CPC ............. *H04S 7/302* (2013.01); *H04R 1/403* (2013.01); *H04R 3/12* (2013.01); *H04R 5/02* (2013.01); *H04S 3/008* (2013.01); *H04S 2400/01* (2013.01)

(58) Field of Classification Search

CPC ...... H04S 7/302; H04S 3/008; H04S 2400/01; H04R 1/403; H04R 3/12; H04R 5/02

USPC ........................................................... 700/94

See application file for complete search history.

(56) References Cited

U.S. PATENT DOCUMENTS

| | | | | |
|---|---|---|---|---|
| 5,440,644 | A | 8/1995 | Farinelli et al. | |
| 5,761,320 | A | 6/1998 | Farinelli et al. | |
| 5,870,484 | A * | 2/1999 | Greenberger ............ | H04R 5/02 381/17 |
| 5,923,902 | A | 7/1999 | Inagaki | |
| 6,032,202 | A | 2/2000 | Lea et al. | |
| 6,256,554 | B1 | 7/2001 | Dilorenzo | |
| 6,404,811 | B1 | 6/2002 | Cvetko et al. | |
| 6,469,633 | B1 | 10/2002 | Wachter et al. | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Paul C McCord

(74) *Attorney, Agent, or Firm* — Fortem IP LLC; Matt Lincicum

(57) ABSTRACT

In some embodiments, a method comprises receiving audio content comprising left input channel signals and right input channel signals, and generating first and second input signals from the left and right input channel signals. The first input signal is based on a sum of the left and right input channel signals, and the second input signal is based on a difference of the left and right input channel signals. An array transfer function is applied to the first and second input signals to produced audio output signals, which can be provided to a plurality of audio transducers on one or more playback devices.

14 Claims, 8 Drawing Sheets

(56) References Cited

U.S. PATENT DOCUMENTS

| | | | | |
|---|---|---|---|---|
| 6,697,491 | B1 * | 2/2004 | Griesinger | H04S 3/02 381/18 |
| 6,757,517 | B2 | 6/2004 | Chang et al. | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,536,021 | B2 * | 5/2009 | Dickins | H04S 3/004 381/310 |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Oureshey et al. | |
| 8,050,434 | B1 | 11/2011 | Kato et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,615,316 | B2 * | 12/2013 | Oh | H04S 7/30 700/94 |
| 8,942,252 | B2 | 1/2015 | Balassanian et al. | |
| 9,197,963 | B1 | 11/2015 | North | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty | |
| 2003/0236580 | A1 * | 12/2003 | Wilson | G11B 20/10527 700/94 |
| 2004/0024478 | A1 | 2/2004 | Hans et al. | |
| 2005/0053249 | A1 * | 3/2005 | Wu | H04S 5/005 381/310 |
| 2007/0142944 | A1 | 6/2007 | Goldberg et al. | |
| 2007/0219808 | A1 * | 9/2007 | Herre | G10L 19/008 704/500 |
| 2008/0097750 | A1 * | 4/2008 | Seefeldt | G10L 19/008 704/201 |
| 2010/0034403 | A1 * | 2/2010 | Mizuno | H04N 5/602 381/306 |
| 2011/0038485 | A1 | 2/2011 | Neoran | |
| 2016/0157016 | A1 * | 6/2016 | Chamness | H04S 1/002 381/98 |
| 2017/0223457 | A1 * | 8/2017 | Park | H04S 7/308 |
| 2017/0364752 | A1 * | 12/2017 | Zhou | H04R 1/326 |
| 2019/0265943 | A1 * | 8/2019 | White | G06F 16/686 |
| 2020/0344563 | A1 * | 10/2020 | Mate | G06F 3/167 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Search Report and Written Opinion dated Nov. 10, 2020, issued in connection with International Application No. PCT/US2020/070472, filed on Aug. 28, 2020, 15 pages.
International Search Report and Written Opinion dated Nov. 10, 2020; International Application No. PCT/US2020/070472; 15 pages.

* cited by examiner

SUM-DIFFERENCE ARRAYS FOR AUDIO PLAYBACK DEVICES

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
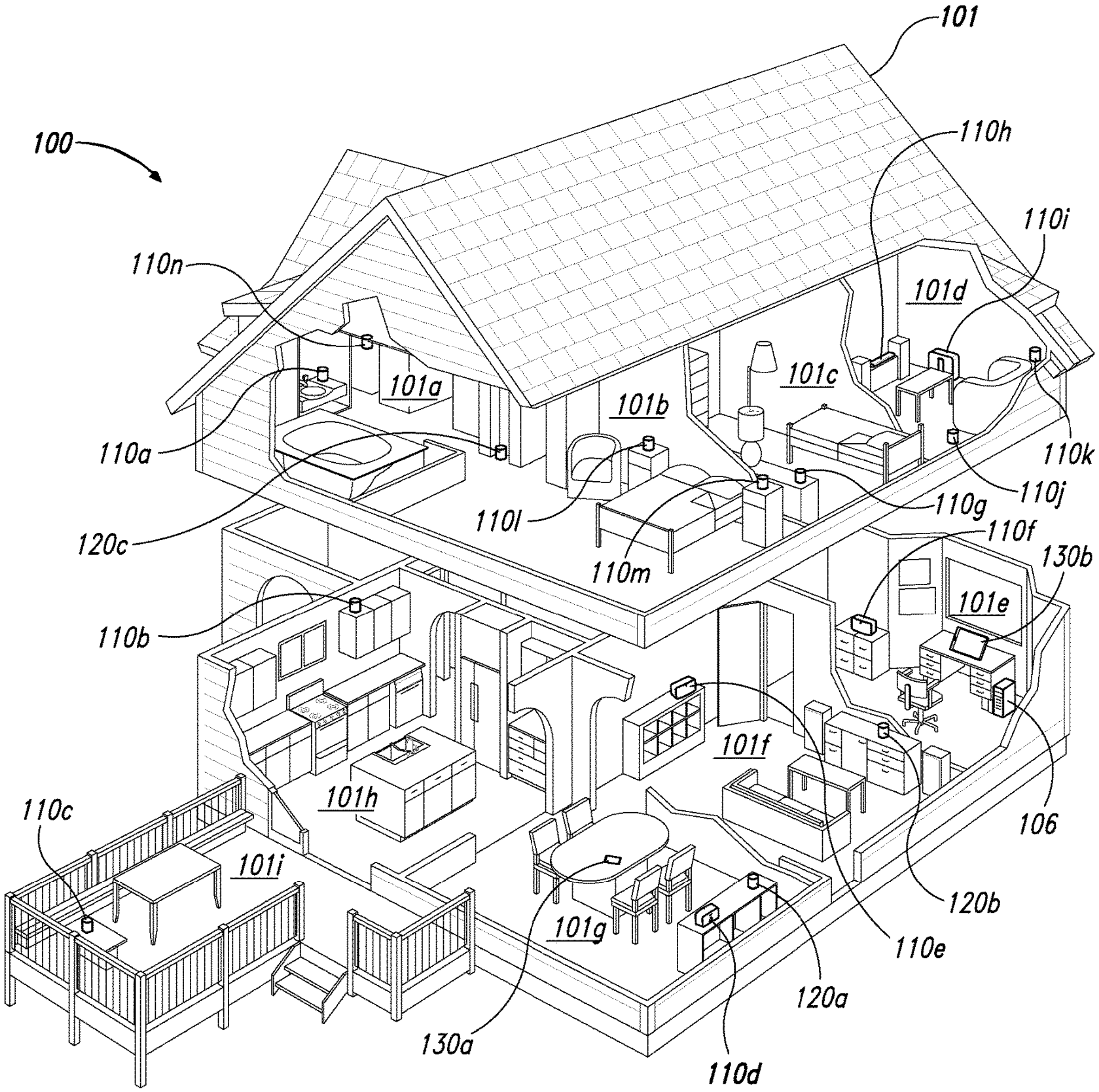
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments of the present disclosure relate to improved systems and methods for processing audio inputs to produce output signals to transducers of a playback device. The transducers may be arrayed to form one or more sound axes, each of which may correspond to an input channel of audio content. For example, a playback device might include nine audio drivers which form multiple sound axes (e.g., corresponding to audio outputs of left, right, and center sound channels). Playback devices often have different playback configurations in which different channels or sound axes of the playback device are utilized to play audio content. The particular playback configuration utilized by the playback device is often determined based on the type of audio content received, and/or the number of channels or sound axes that the received audio content is configured to be played on. For example, standalone audio content (e.g., music) typically includes two distinct input channels (e.g., left and right channels) and results in a playback configuration that utilizes the same number of channels (i.e., two channels) on the playback device. As another example, video-associated audio content (e.g., movie dialogue or soundtrack) may include three distinct input channels (e.g., left, right and center channels) and results in a different playback configuration that utilizes the same number of channels (i.e., three channels) on the playback device. In some instances, the number of channels utilized to play back the received audio content does not match the number of input channels of the audio content. For example, standalone audio content with left and right input channels may be played back on three channels (e.g., left, right, and center channels) of the playback device. In such instances, a new input channel signal must be created for the additional channel of the playback device. The process for creating the additional input channel signal often requires utilizing a static upmixer, in which the audio played via the additional channel (e.g., the center channel) corresponds to a combination of the audio content of the right and left input channels. One shortcoming of using a static upmixer, or other related methods known in the art, is that the generated input channel signal (e.g., from the combined right and left input channels) can include undesirable audio artifacts and generally cause poor audio performance to be played back to the listener. This poor performance is due in part to the processing or alteration of the audio content that occurs, e.g., via the static upmixer, to generate the additional channel. For example, the audio content for the left and right input channels are often highly correlated and/or have the same energy. As a result, combining them to generate audio content for an additional channel (e.g., a center channel) can create undesirable interference patterns for the resulting music perceived by the listener.

Aspects of the present disclosure address at least some of the above described issues. For example, embodiments of the present disclosure include receiving, at a playback device, a source stream of audio content having input channels (e.g., left and right input channels), and generating (i) a first input signal corresponding to a sum of the input channels, and (ii) a second input signal corresponding to a difference of the input channels. One or more array transfer functions can be applied to the generated first and second input signals to produce arrayed output signals. The array transfer functions can include (i) a sum array transfer function applied to the first input signal and (ii) a difference array transfer function, different than the sum array transfer function, applied to the second input signal. Each of the arrayed output signals may comprise portions of the first input signal and portions of the second input signal. The arrayed output signals are provided to a plurality of audio transducers. The audio transducers can be arranged on two or more (e.g., three, four, five, etc.) channels or sound axes of a playback device. As such, each of the audio transducers may receive individual arrayed output signals that include portions of the first input signal and portions of the second input signal.

As explained in more detail below, processing a source stream of audio content in such a manner (e.g., using generated sum and difference input signals and/or sum and difference array transfer functions), as opposed to other methods described elsewhere herein, provides an improved audible experience for the listener. Without being bound by theory, this improved audible experience may be due at least in part to decreased correlation of power levels of the generated sum and difference input signals, relative to that of the left and right channel signals, which are more typically used to produce audio output. As such, the sum and difference input signals, after being arrayed via one or more transfer functions, can be played via multiple channels of the playback device(s) with less risk of undesirable interference, thereby resulting in a better psychoacoustic experience for the listener.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and/or output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers or one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
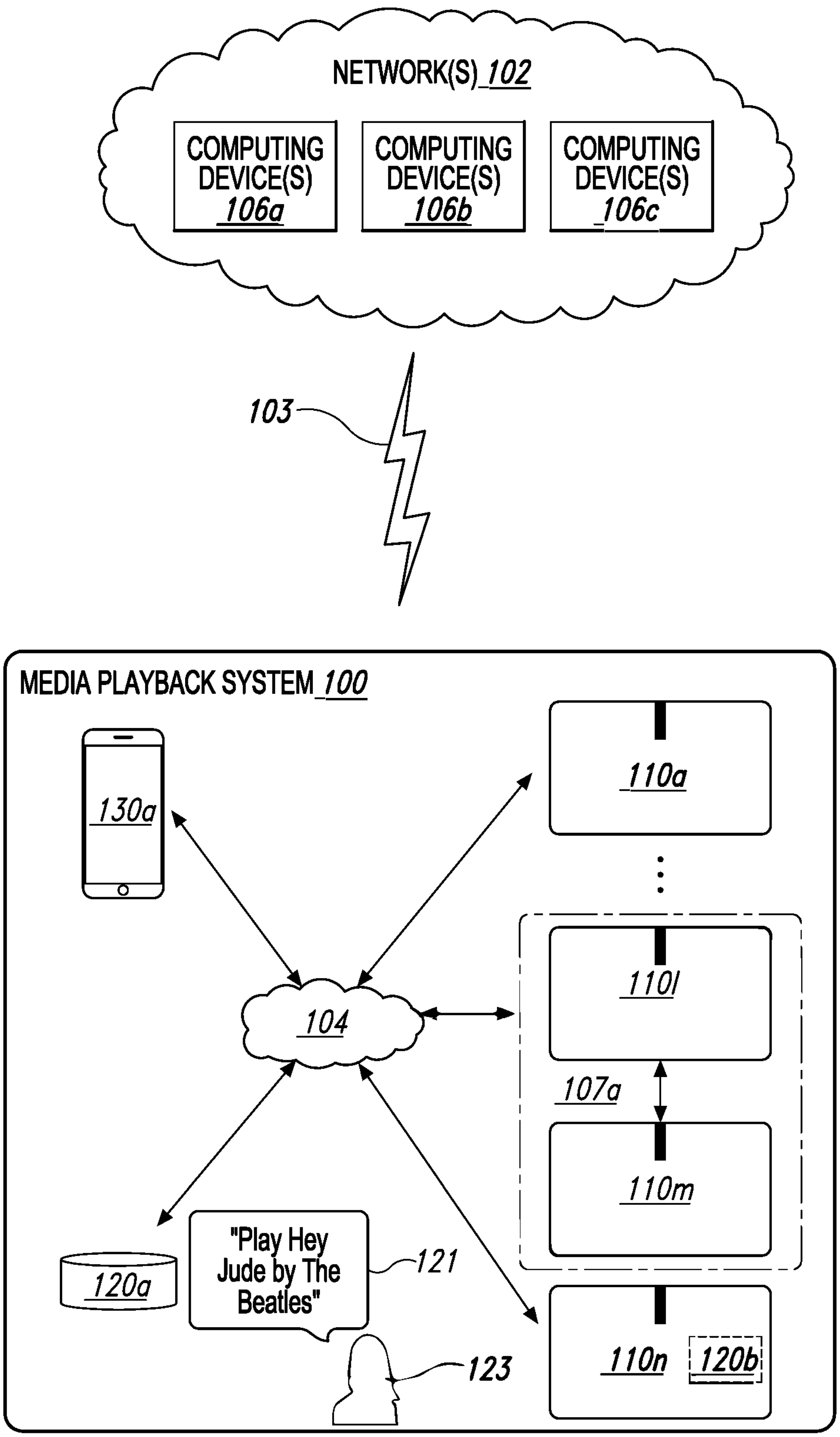
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices **110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110**.

The media playback system 100 includes the NMDs **120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110**.

b. Suitable Playback Devices

Figure 1C:
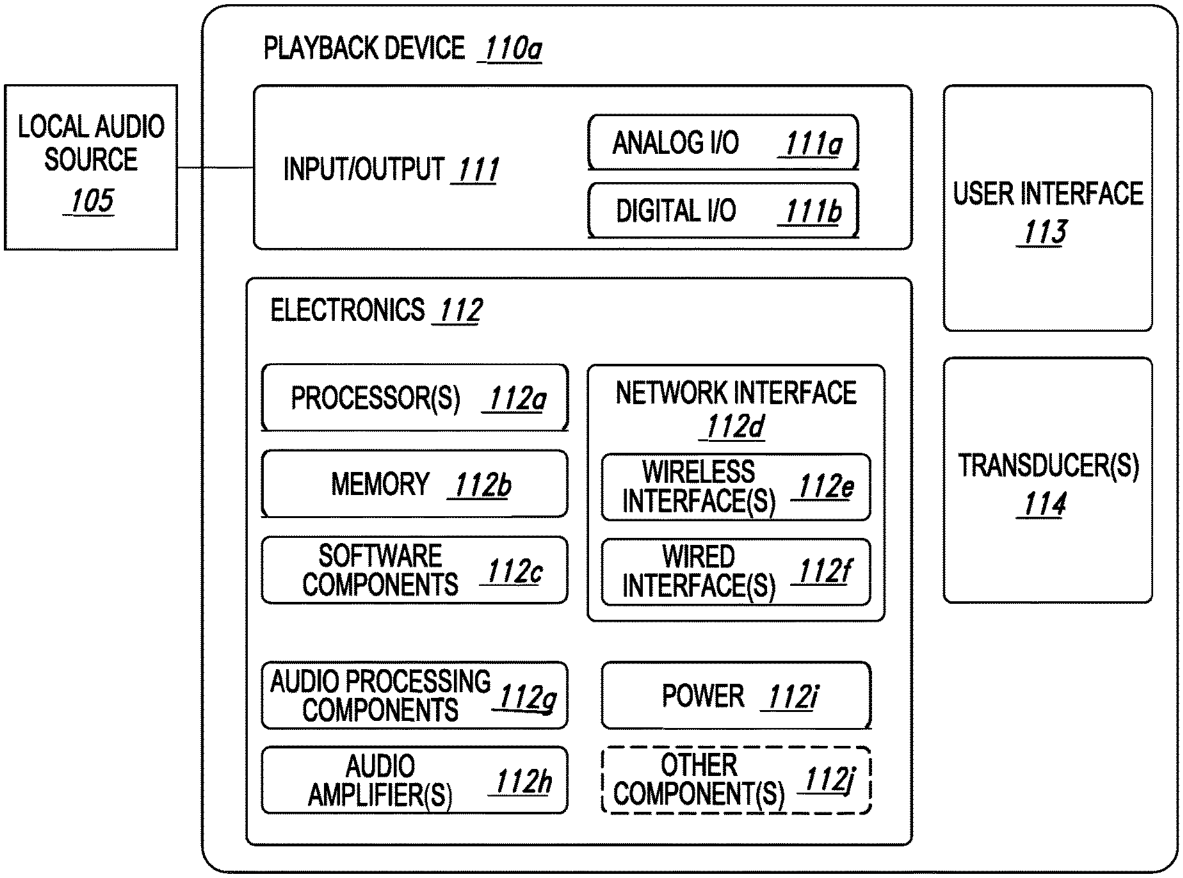
FIG. 1C is a block diagram of a playback device.

FIG. 1C is a block diagram of the playback device **110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b*** comprise interfaces (e.g., ports, plugs, jacks) configured to receive connectors of cables transmitting analog and digital signals, respectively, without necessarily including cables.

The playback device **110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104**.

The playback device **110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115** can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
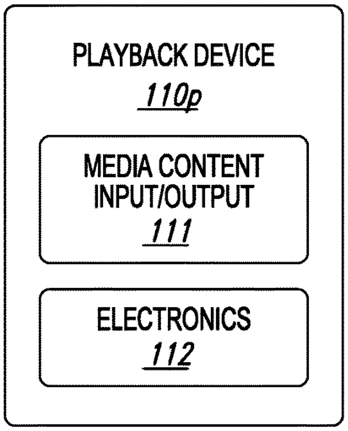
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
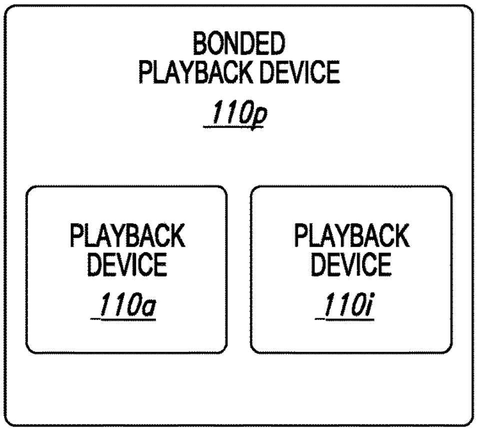
FIG. 1E is a block diagram of a bonded playback device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

c. Suitable Network Microphone Devices (NMDs)

Figure 1F:
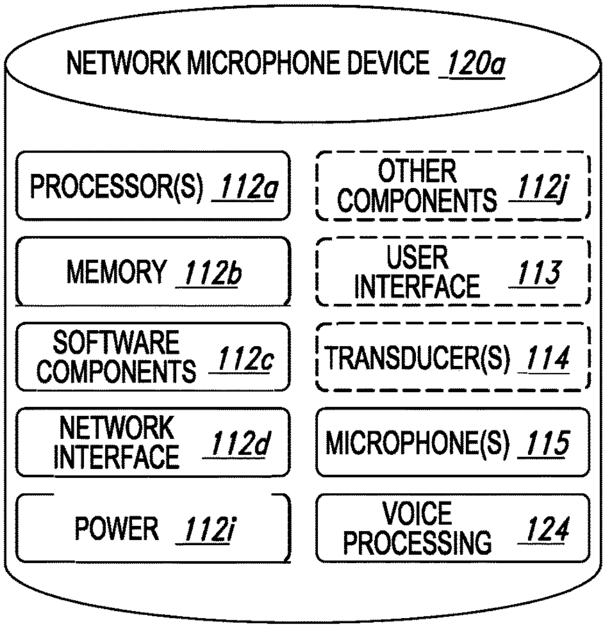
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
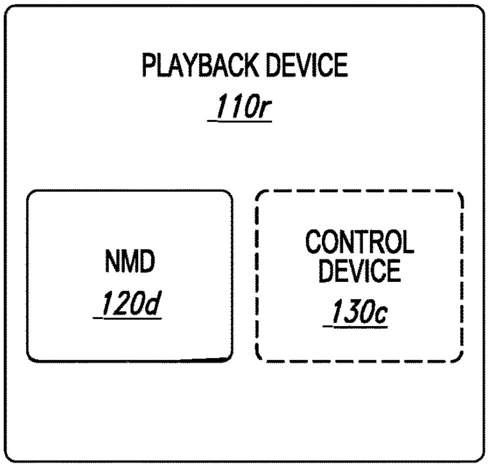
FIG. 1G is a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
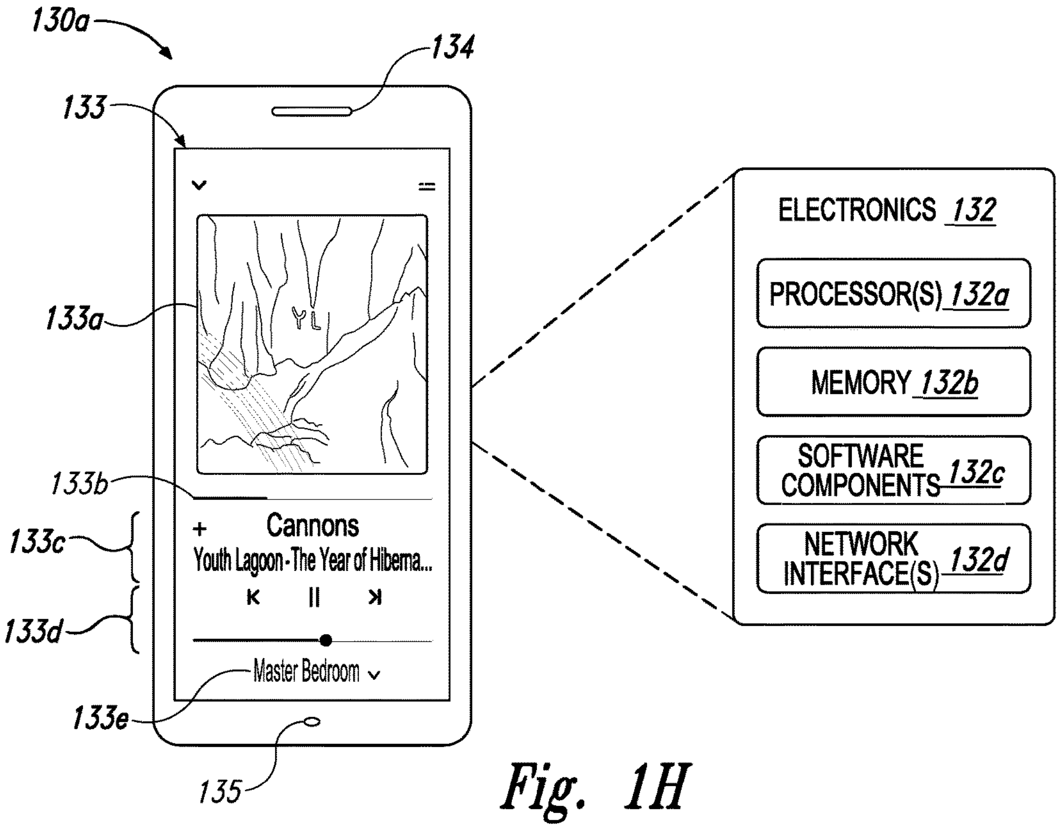
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Methods for Processing Audio Input

A playback device can be configured to play back audio content over multiple channels or sound axes, and can take into account a listener's location relative to the playback device. Playing audio content in such a manner can enhance a listener's experience by allowing the listener to perceive a balanced directional effect. In some instances, however, the multiple channels of the playback device can cause input channels associated with the received audio content to be combined in a manner that actually produces a poor psychoacoustic experience for the listener. As previously described, this poor experience may be due to, for example, the relatively high-power level correlation of the different input channel signals of the received audio content, which when combined can cause undesirable interference patterns. Embodiments of the present disclosure can address these problems by altering the received audio content to generate audio inputs based on a sum and difference of the input channel signals of the received audio content. Array transfer functions can be applied to the generated audio inputs to produce audio output signals, which are then played back via multiple transducers and/or multiple channels (e.g., two channels, three channels, etc.) of the playback device. Producing audio output signals in such a manner can reduce or eliminate the risk of undesirable interference amongst the audio output signals, thereby resulting in a better psychoacoustic experience for the listener.

Figure 2:
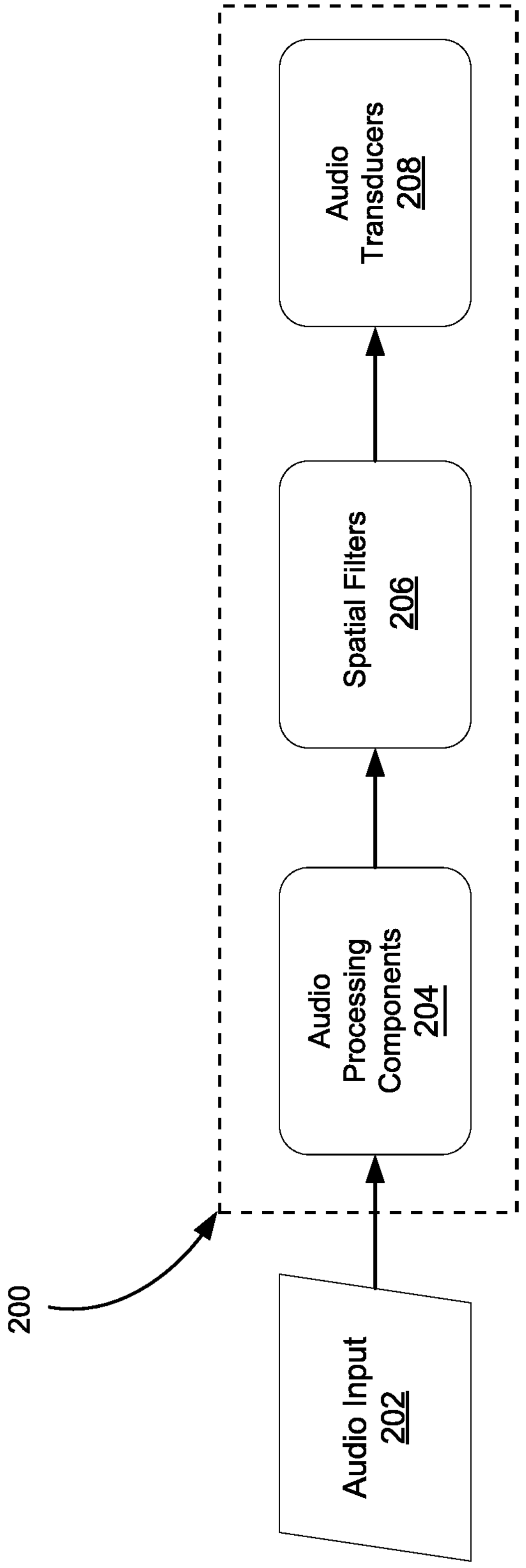
FIG. 2 is a block diagram of a system including filters, in accordance with aspects of the disclosed technology.

FIG. 2 is a block diagram of a system 200 including filters, in accordance with embodiments of the disclosed technology. In some embodiments, the system 200 can form a part of the electronics 112 of the playback device 110*a* (FIG. 1C). As shown in the illustrated embodiment, audio input 202 is received by audio processing components 204 of a playback device. The audio input 202 can include standalone audio content (e.g., music) and/or video-associated audio content (e.g., television or movie audio), and may be retrieved from multiple audio content sources. For example, the audio input 202 may be retrieved by the playback device over a network via one or more other playback devices or network devices, or retrieved by a playback device directly from a corresponding audio content source (e.g., a line-in connection). The audio content of the audio input 202 can include multiple input channels (e.g., two, three, four, or more input channels). Standalone audio content, for example, can include two input channels (e.g., left and right input channels), three input channels (e.g., left, right, and center input channels), or four or more input channels. As another example, video-associated audio content can include three input channels (e.g., left, right, and center input channels), or four or more input channels.

As shown in the illustrated embodiment, the audio processing components 204 are configured to receive the audio input 202 and alter the audio input 202 to generate input signals with different aspects or parameters (e.g., different frequencies, amplitudes, etc.). In some embodiments, for example, the audio input 202 includes a first input channel (e.g., a left input channel) and a second input channel (e.g., a right input channel). The first and second input channels can be altered, e.g., via the audio processing components 204, to generate input signals with different parameters than those of the first and/or second input channels. For example, the first and second input channels can be used to produce one or more sum input signals (referred to hereinafter as "sum input signal") and one or more difference input signals (referred to hereinafter as "difference input signal"). As shown in Equations (1) and (2) below, the sum input signal is a sum of the first and second input channels, and the difference input signal is a difference of the first and second input channels. As also shown in Equations (1) and (2) below, in some embodiments, a constant "k" may be applied to each of the sum and difference of the first and second input channels, such that the sum and difference input signals are a fraction or multiple of the sum or difference of the first and second input channels. The "k" value can equal 1, SQRT(2), or 0.5, and may be chosen based on various factors, such as the expected orientation of a playback device relative to the layout of a room.

$$S=k(L+R); \quad \text{(Equation 1)}$$

$$D=k(\text{abs}(L-R); \quad \text{(Equation 2)}$$

where:

S is the sum input signal;

D is the difference input signal;

L is the first input channel;

R is the second input channel; and k is a constant.

Still referring to FIG. 2, the generated sum and difference input signals are provided to a set of filters (e.g., spatial filters) 206. The filters 206 can process the generated sum and difference input signals, e.g., by applying a sum array transfer function and a difference array transfer function to the generated sum and difference input signals, respectively, to produce audio output signals, which are then applied to a plurality of audio transducers 208. For example, as shown in Equation 3 below, the sum array transfer function can be applied to the sum input signal to produce a sum output signal, the difference array transfer function can be applied to the difference input signal to produce a difference output signal, and the combination of the sum and difference output signals can correspond to the audio output signal provided to individual transducers of the audio transducers 208.

$$T_0=H_{S0}S+H_{D0}D; \quad \text{(Equation 3)}$$

where:

$T_0$ is the audio output signal provided to or received by an individual transducer;

S is the sum input signal;

$H_{S0}$ is the sum array transfer function applied to the sum input signal for the individual transducer;

D is the difference input signal; and $H_{D0}$ is the difference array transfer function applied to the difference input signal for the individual transducer.

In some embodiments, the sum and difference array transfer functions determine the relative contribution of the sum input signal and the difference input signal, respectively, for an audio output signal that is provided to individual transducers of the playback device. That is, in applying the sum and difference array transfer functions to the sum and difference input signals, respectively, the portion of the audio output signal that corresponds to the sum input signal, and thus the difference input signal, can vary. For example, the portion of the audio output signal corresponding to the sum input signal can be 95%, 90%, 85%, 80%, 75%, 70%, 65%, 60%, 55%, 50%, 45%, 40%, 35%, 30%, 25%, 20%, or any value therebetween, with the balance of the audio output signal corresponding to the difference input signal. In addition to or in lieu of the foregoing, the portion of an audio output signal corresponding to the sum input signal can differ from that of other audio output signals provided to other individual transducers of the plurality of audio transducers 208. For example, the portion of the audio output signal corresponding to the sum input signal may be 80% for a first transducer of the plurality of audio transducers 208, 70% for a second transducer of the plurality of audio transducers 208, and 60% for a third transducer of the plurality of audio transducers 208.

The sum and difference array transfer functions applied to the generated sum and difference input signals may vary based on a number of factors, including the number of input channel signals of the received audio content, the type of received audio content (e.g., standalone audio or video-associated audio), the number of channels or sound axes of the playback device, and/or the number of transducers or audio drivers associated with each of the channels or sound axes of the playback device, amongst other factors.

As such, the sum and difference array transfer functions utilized to provide audio for a first audio output channel or set of transducers may differ from the sum and difference array transfer functions utilized to provide audio for a second audio output channel or set of transducers. For example, the sum and difference array transfer functions used when the expected number of audio output channels is two channels (e.g., left and right channels) may differ from the sum and difference array transfer functions used when the expected number of audio output channels is three channels (e.g., left, right, and center channels) or more. As another example, the sum and difference array transfer functions used when the playback device or channel includes four transducers may differ from the sum and difference array transfer functions used when the playback device or channel includes six transducers. In such embodiments, the audio output signal received from the filters 206 by the individual audio transducers 208 varies depending on the total number of audio output channels or transducers used during playback.

As previously described, the audio output signals produced by applying the sum and difference array transfer functions to the generated sum and difference input signals are provided to the audio transducers 208. The plurality of audio transducers 208 can include two or more (e.g., three, four, five, six, seven, eight, nine, etc.) audio transducers of a playback device. In addition to or in lieu of the foregoing, the audio transducers 208 can be housed in multiple separate playback devices (e.g., two, three, four, five, or more playback devices) of a media playback system. In operation, the transducers or audio drivers may be arrayed to form a sound axis, which may correspond to an input channel of audio content. For example, a device (e.g., a sound-bar type device) might include nine audio drivers which form multiple sound axes (e.g., left, right, and center sound channels). Any audio driver may contribute to any number of sound axes. For example, a left axis of a sound system may be formed via contributions from all nine audio drivers in the example sound-bar type device. Alternatively, an axis may be formed by a single audio driver.

Example media playback systems described herein may adopt various playback configurations representing respective sets of sound axes. Example playback configurations may include respective configurations based on the number of input channels (e.g., mono, stereo, surround, or any of the above in combination with a subwoofer). Other example playback configurations may be based on the content type. For instance, a first set of axes may be formed by audio drivers of a media playback system when playing standalone audio, and a second set of axes formed by the audio drivers when playing video-associated audio. Other playback confirmations may be invoked by various groupings of playback devices within the media playback system.

An advantage of embodiments of the present disclosure is that the sum and difference input signals can provide an enhanced psychoacoustic experience for the listener. As described elsewhere herein, the sum and difference inputs are relatively uncorrelated with one another, in that the sum input signals generally have a higher energy level (e.g., 2-10 decibels higher) than the difference input signals. In contrast, the relatively high correlation between energy levels of the left and right input channel signals, which are commonly used in playback devices, can result in poor audible performance when they are combined, e.g., via an upmixer, to provide audio to a third (e.g., center) sound axis or channel of a playback device. Additionally, because the risk of undesirable interference when combining the sum and difference input signals is relatively limited, audio input can be processed and provide a consistent audio quality irrespective of whether the channels associated with the audio output are equal to or greater than the channels associated with the audio input. Yet another advantage of embodiments of the present disclosure is that audio content can be processed regardless of whether it is standalone audio content and video-associated audio content, without sacrificing audible quality for the listener.

In some embodiments, it may be desirable to calibrate or correct the audio output to compensate for artifacts due to the same of a room, position or acoustically reflective objects in the listening environment, or other factors. For example, a spectral calibration procedure can be used to characterize the frequency of a room in which a playback device is operating. Once the frequency response of the room is known, equalization and/or other audio playback parameters can be adjusted to compensate for the frequencies that the room tends to attenuate or amplify I order to improve the listening experience. This calibration (e.g., adjusting equalization or other audio playback performers) may be improved by performing the calibration in the sum-difference domain rather than in the left-right domain. That is, by performing spectral calibration on sum-and-difference channels (which are relatively uncorrelated), as opposed to left-and-right channels (which are relatively correlated), the calibration process can achieve better psychoacoustic results and reduce the risk of undesirable interference or other audible artifacts. In some embodiments, such a spectral calibration procedure may be the Sonos Trueplay calibration procedure.

Figure 3:
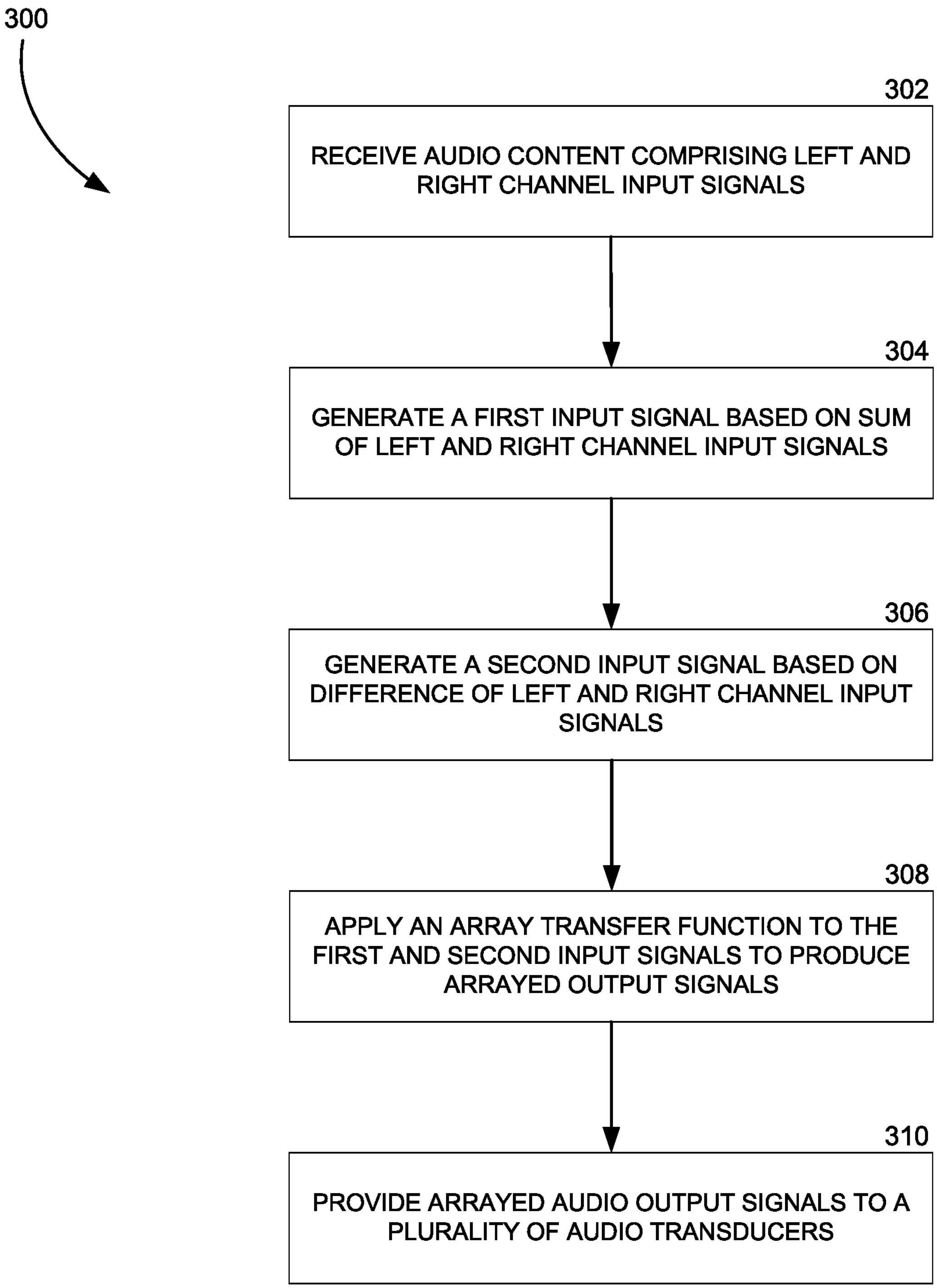
FIG. 3 is a flow diagram of a process for processing audio content to provide audio output signals to a plurality of transducers, in accordance with aspects of the present technology.

FIG. 3 is a flow diagram of a process 300 for processing audio content to provide audio output signals to a plurality of transducers, in accordance with aspects of the present technology. In some embodiments, the process 300 includes one or more instructions stored in memory (e.g., the memory 112*b* of FIG. 1) and executed by one or more processors (e.g., the process 112*a* of FIG. 1) of a playback device 9 e.g., the playback device 110 of FIG. 1).

The process 300 includes receiving, e.g., at a playback device, audio content comprising a left input channel signal (e.g., a first input channel signal) and a right input channel signal (e.g., a second input channel signal) (process portion 302). The audio content can correspond to the audio content described elsewhere herein, e.g., with reference to FIG. 2. For example, the audio content can comprise standalone audio content or video-associated audio content. As described in more detail elsewhere herein, in some embodiments the audio content can include both first audio content corresponding to standalone audio and second audio content corresponding to video-associated audio. In such embodiments, the audio content may be processed based on its type and/or the number of input channel signals of the audio content. That is, the first audio content may be processed via a first process to provide first audio output signals, and the second audio content may be processed via a second, different process to provide second audio output signals different than the first audio output signals.

The process 300 further comprises generating a first input signal based on a sum of the left and right input channel signals (process portion 304), and generating a second input signal based on a difference or absolute difference of the left and right input channel signals (process portion 306). The first input signal can correspond to the sum input signal described elsewhere herein and the second input signal can correspond to the difference input signal described elsewhere herein, e.g., with reference to FIG. 2.

The process 300 further comprises applying an array transfer function to the first and second input signals to produce arrayed output signals (process portion 308). The array transfer function can include one or more array transfer functions, and may be applied to the first and second input signals, for example forming a plurality of spatial filters. In some embodiments, applying the array transfer function can include applying a first array transfer function to the first input signal, and applying a second array transfer function to the second input signal. The first and second array transfer functions can correspond to the sum and difference array transfer functions, respectively, described elsewhere herein, e.g., with reference to FIG. 2. As described elsewhere herein, the first and second array transfer functions can determine an overall contribution of the first and second input signals that are ultimately provided to audio transducers of the playback device. The array transfer functions can be based on the number of input channel signals of the received audio content, the type of received audio content (e.g., standalone audio or video-associated audio), the number of expected channels or sound axes of the playback device(s), and the number of transducers or audio drivers associated with each of the channels or sound axes of the playback device(s), among other factors.

The process 300 further comprises providing the arrayed output signals to a plurality of audio transducers (process portion 310). The plurality of audio transducers can correspond to the audio transducers described elsewhere herein, e.g., with reference to FIG. 2. In some embodiments, the audio transducers can be arrayed on two or more sound axes or channels of one or more playback devices. As an example, when the audio transducers are arrayed onto two sound axes, the array transfer functions may be applied to the first and second input signals to produce (i) first audio output signals that are provided to a first set of transducers on the first of the two sound axes, and (ii) second audio output signals that are provided to a second set of transducers on the second of the two sound axes. In such embodiments, the first and second audio outputs may be distinct from one another in that the contribution of the first input signal (e.g., corresponding to the sum input signal) and the second input signal (e.g., corresponding to the difference input signal) is different for each of the first and second audio outputs. In some embodiments, the first set of transducers associated with the first sound axis and the second set of transducers associated with the second axes can partially or completely overlap, such that at least one transducer is associated with both the first and second sound axes. In some embodiments, the first and second sets of transducers can be exclusive, such that no transducer is associated with both the first and second sound axes. These configurations can be extended to additional sets of transducers and additional sound axes (e.g., three, four, five more sound axes).

As another example, when the audio transducers are arrayed to three sound axes, the array transfer functions may be applied to the first and second input signals to produce (i) first audio output signals that are provided to a first set of transducers on the first of the three sound axes, (ii) second audio output signals that are provided to a second set of transducers on the second of the three sound axes, and (iii) third audio output signals that are provided to a third set of transducers on the third of the three sound axes. In such embodiments, the first, second, and third audio outputs may be distinct from one another in that the contribution of the first input signal (e.g., corresponding to the sum input signal) and the second input signal (e.g., corresponding to the difference input signal) is different for each of the first, second, and third audio outputs. As described elsewhere herein, the sets of transducers can partially or completely overlap, or alternatively may be mutually exclusive sets.

Figure 4:
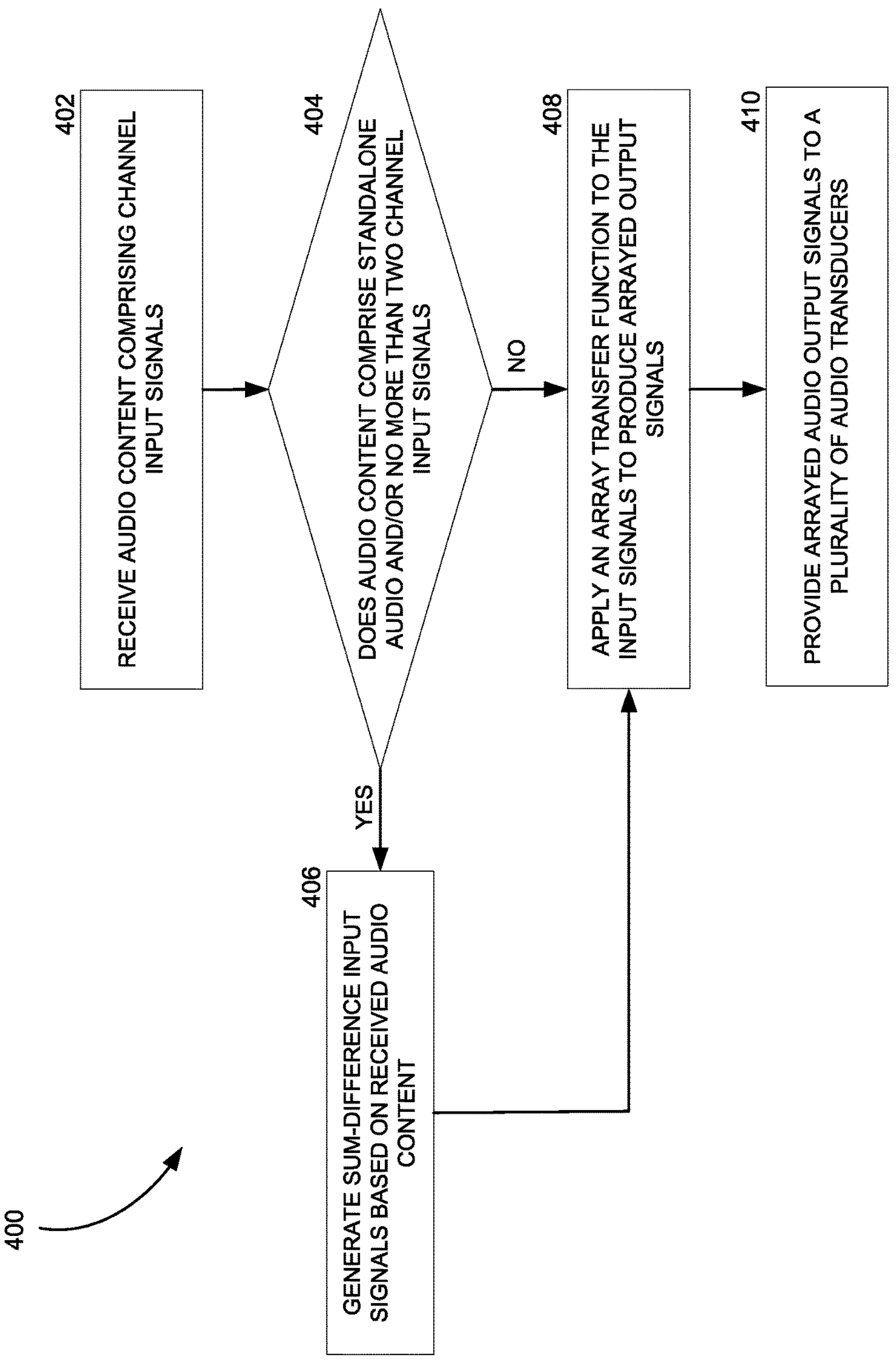
FIG. 4 is a decisional flow chart of a process for processing audio content to provide audio output signals to a plurality of transducers, in accordance with aspects of the present technology.

As previously described, processing audio content may be based on the type of audio content received. That is, audio content corresponding to standalone audio content may be processed differently that audio content corresponding to video-associated audio content. In addition to or in lieu of the foregoing, processing the audio content may be based on the number of input channels of the audio content received. FIG. 4 describes an example of some embodiments in which audio content is processed based on the type of audio content and/or the number of input channel signals of the audio content.

FIG. 4 is a decisional flow chart of a process 400 for processing audio content to provide audio output signals to a plurality of transducers. In some embodiments, the process 400 includes one or more instructions stored in memory (e.g., the memory 112*b* of FIG. 1) and executed by one or more processors (e.g., the process 112*a* of FIG. 1) of a playback device 9 e.g., the playback device 110 of FIG. 1).

The process 400 includes receiving, e.g., at a playback device, audio content comprising input channel signals (process portion 402). Depending on the type of audio content, the number of input channel signals can vary. For example, standalone audio content may include two input channel signals, and video-associated audio content may include three input channel signals. Process portion 404 determines whether the received audio content includes standalone audio content and/or no more than two input channel signals. If the received audio content is standalone audio content and/or includes no more than two input channel signals, the process 400 proceeds to generate sum and difference input signals based on the received audio content (process portion 406). The sum and difference input signals can correspond to the sum and difference input signals described elsewhere herein, e.g., with reference to FIG. 2. After generating the sum and difference input signals, the process 400 proceeds to process portion 408.

If the received audio content is not standalone audio or includes three or more input channel signals, the process 400 proceeds directly from process portion 404 to process portion 408. Process portion 408 includes applying an array transfer function to the input signals (e.g., the generated sum and difference input signals or the input channel signals) to produce arrayed output signals. The array transfer function(s) applied to the input signals can be utilized to process one or both of standalone audio content and video-associated audio content. That is, the same array transfer function(s) may be utilized irrespective of the type of audio content. Accordingly, embodiments of the present disclosure enable a single playback device to process both standalone audio content and video-associated audio content, and produce audio output signals having similar quality. Additionally or alternatively, in some embodiments a single playback device may be configured to utilize different array transfer functions for two-channel input (e.g., standalone audio content or stereo music input) as compared to input having three or more channels (e.g., video-associated audio content).

As described elsewhere herein, the array transfer function can include one or more array transfer functions, and may be applied to the sum and difference input signals or the input channel signals via a plurality of spatial filters. In some embodiments, applying the array transfer function can include applying a first array transfer function to the sum input signal or one of the input channel signals, and applying a second array transfer function to the difference input signal or the other of the input channel signals. The first and second array transfer functions can correspond to the sum and difference array transfer functions, respectively, described elsewhere herein, e.g., with reference to FIG. 2. As described elsewhere herein, the first and second array transfer functions can determine an overall contribution of the first and second input signals that are ultimately provided to audio transducers. The array transfer functions can be based on the number of input channel signals of the received audio content, the type of received audio content (e.g., standalone audio or video-associated audio), the number of expected channels or sound axes of the playback device(s), and the number of transducers or audio drivers associated with each of the channels or sound axes of the playback device(s), amongst other factors.

The process 400 further comprises providing the arrayed output signals to a plurality of audio transducers (process portion 410). The plurality of audio transducers can correspond to the audio transducers described elsewhere herein, e.g., with reference to FIG. 2. In some embodiments, the audio transducers can be arrayed on two or more sound axes or channels of one or more playback devices. As an example, when the audio transducers are arrayed to two sound axes, the array transfer functions may be applied to the first and second input signals to produce (i) first audio output signals that are provided to a first set of transducers on the first of the two sound axes, and (ii) second audio output signals that are provided to a second set of transducers on the second of the two sound axes. In such embodiments, the first and second audio outputs may be distinct from one another in that the contribution of the first input signal (e.g., corresponding to the sum input signal) and the second input signal (e.g., corresponding to the difference input signal) is different for each of the first and second audio outputs.

As another example, when the audio transducers are arrayed to three sound axes, the array transfer functions may be applied to the first and second input signals to produce (i) first audio output signals that are provided to a first set of transducers on the first of the three sound axes, (ii) second audio output signals that are provided to a second set of transducers on the second of the three sound axes, and (iii) third audio output signals that are provided to a third set of transducers on the third of the three sound axes. In such embodiments, the first, second, and third audio outputs may be distinct from one another in that the contribution of the first input signal (e.g., corresponding to the sum input signal) and the second input signal (e.g., corresponding to the difference input signal) is different for each of the first, second, and third audio outputs.

Figure 5:
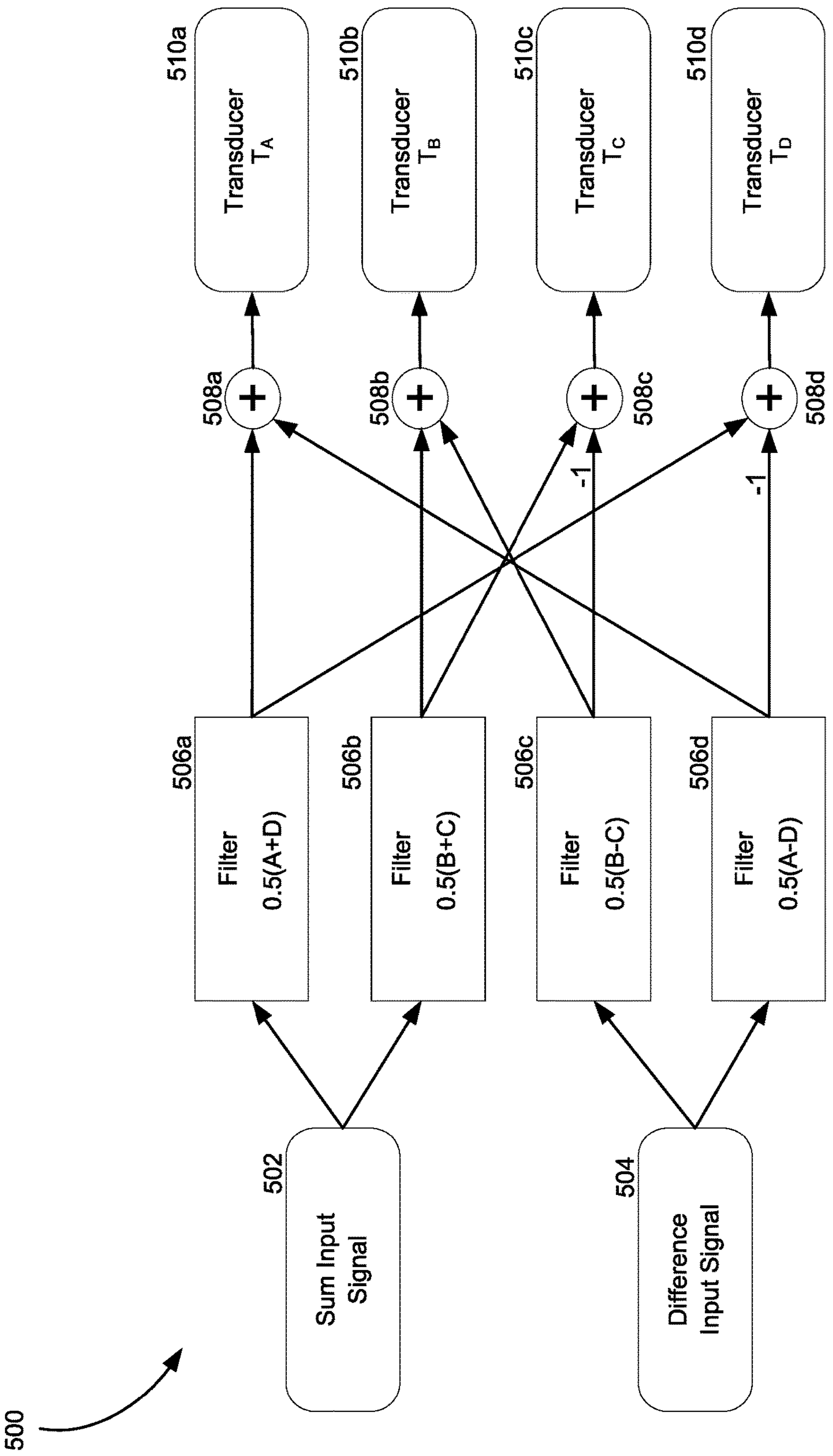
FIG. 5 is a functional block diagram of a system including an example set of filters for processing an audio input, in accordance with aspects of the present technology.

FIG. 5 is a functional block diagram of a system 500 including filters for processing an audio input, in accordance with aspects of the present technology. As shown in the illustrated embodiment, the system 500 includes a sum input signal 502 and a difference input signal 504, which correspond to the sum and difference input signals described elsewhere herein, e.g., with reference to FIG. 2. That is, the sum input signal 502 can correspond to a combination of first and second (e.g., left and right) input channel signals, and the difference input signal 504 can correspond to a difference of the first and second input channel signals. The sum and difference input signals 502, 504 are provided to a plurality of filters 506*a-d*, whose outputs can be combined via modules 508*a-d* to provide output to transducers 510*a-d*.

As shown in FIG. 5, the sum input signal 502 is provided to filter 506*a* and filter 506*b*, and the difference input signal 504 is provided to filter 506*c* and filter 506*d*. Each of the filters 506*a-d* can be configured to process the received input signal by applying a transfer function thereto and producing processed audio signals. Individual processed audio signals from each of the filters 506*a-d* can be combined, e.g., via modules 508*a-d*, with other individual audio processed signals from the other individual filters 506*a-d*. As shown in the illustrated embodiment, the audio processed signals from filter 506*a* are provided to modules 508*a*, 508*d*, where they are individually combined with the audio processed signals from filter 506*d*. That is, module 508*a* adds the outputs of filter 506*a* and filter 506*d*, and the module 508*d* subtracts the output of filter 506*d* from the output of filter 506*a*. The audio output signal from module 508*a* is provided to transducer 510*a*, and the audio output signal from module 508*d* is provided to transducer 510*d*. As also shown in the illustrated embodiment, the audio processed signals from filter 506*b* are provided to modules 508*b*, 508*c*, where they are individually combined with the audio processed signals from filter 506*c*. That is, module 508*b* adds the outputs of filter 506*b* and filter 506*c*, and the module 508*c* subtracts the output of filter 506*c* from the output of filter 506*b*. The audio output signal from module 508*b* is provided to transducer 510*b*, and the audio output signal from module 508*c* is provided to transducer 510*c*.

The filters 506*a-d* can be configured such that the various combinations via modules 508*a-d* provide distinct outputs to the transducers 510*a-d*, each of which includes a combination of the sum input signal 502 and the difference input signal 504. As shown in the illustrated embodiment, for example, filter 506*a* can correspond to 0.5 (A+D) and the fourth filter 506*d* can correspond to 0.5(A-D), where A and D are distinct processing components. When the outputs of the filter 506*a* and the filter 506*b* are summed via module 508*a* and provided to the transducer 510*a*, the transducer 510*a* effectively receives a combination of the sum input signal 502 as processed using processing component A (via first filter 506*a*) and the difference input signal 504 as processed using processing component A (via filter 506*d*). In such embodiments, the outputs as processed using processing component D cancel out via module 508*a*. Filters 506*b-d* and transducers 510*b-d* provide a similar result. That is, each transducer 510*b-d* receives a combination of the sum channel input signal 502 and the difference channel input signal 504 as processed by a particular processing component (e.g., transducer 510*b* receives output as effectively filtered by processing component B, transducer 510*c* receives output as effectively filtered by processing component C, and transducer 510*d* receives output as effectively filtered by processing component D). The transducers 510*a-d* can be arrayed, e.g., onto two sound axes of a playback device. For example, the transducers 510*a*, 510*b* may be arrayed on a first sound axes and the transducers 510*c*, 510*d* may be arrayed on a second sound axes. In some embodiments, the number of transducers can be increased, e.g., to accommodate more than two sound axes. For example, the system 500 can include six transducers to accommodate two sound axes, six transducers to accommodate three sound axes, eight transducers to accommodate four sound axes, etc.

An advantage of embodiments of the present disclosure is the ability to decrease the number of filters needed for processing audio input. For example, at least some conventional systems with two channel inputs, four filtering schemes, and four transducers require eight filters to process a source stream of audio input and provide audio output therefrom. For example, to process left and right input channel signals, the left input channel signal is provided to a first set of four filters, and the right input channel signal is provided to a second set of four filters. The audio processed signal from the each of the first set of filters is combined, e.g., via a module, with a corresponding audio processed signal from each of the second set of filters to produce four audio output signals, which are provided to the four transducers. As such, a left channel input and right channel input would each be processed using a distinct filter, and then be combined before being output to a first transducer. However, by utilizing sum-difference techniques as described herein, embodiments of the present disclosure can utilize a configuration with two channel inputs, four filtering schemes, and four transducers to produce audio output using only four filters. This benefit can be realized with any configuration having an even number (e.g., four, six, eight, ten, twelve, etc.) of transducers, such as the embodiment shown in FIG. 5, in which each of the filters 506*a-d* is considered to be a "symmetric" filter. In such embodiments, the total number of filters used to process sum and difference input signals can advantageously be reduced by half, relative to the number of filters typically needed to process left and right input channel signals. Decreasing the number of filters can make available extra space and processing resources in the playback device for additional audio processing components that can be used to provide an enhanced psychoacoustic experience for the listener.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1

A method, comprising: receiving, at a playback device, a source stream of audio content comprising a left input channel signal and a right input channel signal; generating a first input signal based on a sum of the left and right input channel signals; generating a second input signal based on a difference of the left and right input channel signals; applying an array transfer function to the first and second input signals to produce arrayed audio output signals; and providing the arrayed audio output signals to a plurality of audio transducers.

Example 2

The method of Example 1, wherein applying the array transfer function comprises (i) applying a first array transfer function to the first input signal, and (ii) applying a second array transfer function, different that the first array transfer function, to the second input signal.

Example 3

The method of any one of Examples 1 or 2, wherein providing the arrayed audio output signals comprises providing the arrayed audio output signals to the plurality of audio transducers on three or more sound axes of the playback device.

Example 4

The method of any one of Examples 1 or 2, wherein: (a) the arrayed audio output signals include at least a first audio output signal, a second audio output signal, and a third audio output signal, (b) the plurality of audio transducers includes at least a first transducer, a second transducer, and a third transducer, and (c) providing the arrayed audio output signals includes: (i) providing the first audio output signal to the first transducer on a first sound axis of the playback device, (ii) providing the second audio output signal to the second transducer on a first sound axis of the playback device, and (iii) providing the third audio output signal to a third transducer on a first sound axis of the playback device.

Example 5

The method of Example 4, wherein each of the first, second, and third audio output signals include a portion of the first input signal and a portion of the second input signal.

Example 6

The method of any of Examples 1-5, wherein the source stream of audio content comprises standalone audio content.

Example 7

The method of any one of Examples 1-6, wherein generating the first input signal and generating the second input signal is done via a sum-difference generator.

Example 8

The method of any one of Examples 1-7, wherein applying the array transfer function comprises applying the array transfer function via a plurality of spatial filters.

Example 9

The method of Example 8, wherein individual ones of the plurality of spatial filters are symmetric with at least another individual one of the plurality of spatial filters.

Example 10

The method of any one of Examples 1-9, wherein the audio content is first audio content, the array transfer function is a first array transfer function, and the arrayed audio output signals are arrayed first audio output signals, the method further comprising: (i) receiving, at the playback device, second audio content comprising three or more input channel signals; (ii) applying a second array transfer function to the three or more input channel signals to produce arrayed second audio output signals; and (iii) providing the arrayed second audio output signals to the plurality of audio.

Example 11

The method of any one of Examples 1-10, wherein the array of audio transducers is contained within the playback device.

Example 12

The method of any one of Examples 1-11, wherein the playback device is a first playback device, and wherein at least some of the audio transducers are contained within a second playback device.

Example 13

The method of any one of Examples 1-12, wherein a correlation between the left input channel signal and right input channel signal is greater than a correlation between the first input signal and the second input signal.

Example 14

The method of any one of Examples 1-13, wherein the array transfer function is configured to be applied to standalone audio content and video-associated audio content.

Example 15

A tangible, non-transitory, computer-readable medium having instructions stored thereon that are executable by one or more processors to cause a network microphone device to perform the method of any one of Examples 1 to 14.

Example 16

An audio signal processing system of a playback device, the system comprising a processor; and tangible, non-transitory, computer-readable media storing instructions executable by the processor to cause the audio signal processing system to perform the method of any one of Examples 1 to 14.

Example 17

A network microphone device comprising one or more microphones configured to detect sound, one or more processors, and a tangible, non-transitory computer-readable medium having instructions stored thereon that are executable by the one or more processors to cause the network microphone device to perform the method of any of Examples 1 to 14.

The invention claimed is:

1. A method, comprising:

receiving, at a playback device including a plurality of audio transducers, a first source stream of audio content;

determining whether the first source stream of audio content is (i) standalone audio content having a left input channel signal and a right input channel signal or (ii) video-associated audio content having at least a left input channel signal, a right input channel signal, and a center input channel signal;

after determining that the first source stream of audio content is standalone audio content:

generating a sum input signal based on a sum of the left and right input channel signals;

generating a difference input signal based on a difference of the left and right input channel signals;

providing the sum input signal to a first plurality of spatial filters to generate first spatial filter output signals;

providing the difference input signal to a second plurality of spatial filters to generate second spatial filter output signals;

combining the first spatial filter output signals and the second spatial filter output signals to produce a first plurality of audio output signals such that each of the first plurality of audio output signals is based on both at least one of the first spatial filter output signals and at least one of the second spatial filter output signals; and providing each of the first plurality of audio output signals to a respective one of the plurality of audio transducers;

receiving, at the playback device, a second source stream of audio content;

determining whether the second source stream of audio content is (i) standalone audio content having a left input channel signal and a right input channel signal or (ii) video-associated audio content having at least a left input channel signal, a right input channel signal, and a center input channel signal;

after determining that the second source stream of audio content is video-associated audio content:

without generating sum or difference signals based on the left, right, and center input channel signals, applying a second array transfer function to the left, right, and center input channel signals to produce a second plurality of audio output signals; and providing each of the second plurality of audio output signals to a respective one of the plurality of audio transducers.

2. The method of claim 1, wherein providing the second arrayed audio output signals comprises providing the second arrayed audio output signals to the plurality of audio transducers on three or more sound axes of the playback device.

3. The method of claim 1, wherein:

the second arrayed audio output signals include at least a first audio output signal, a second audio output signal, and a third audio output signal, the plurality of audio transducers includes at least a first transducer, a second transducer, and a third transducer, and providing the second arrayed audio output signals includes— providing the first audio output signal to the first transducer on a first sound axis of the playback device, providing the second audio output signal to the second transducer on a first sound axis of the playback device, and providing the third audio output signal to a third transducer on a first sound axis of the playback device.

4. The method of claim 1, wherein the difference in power level between the left input channel signal and right input channel signal is less than the difference in power level between the sum input signal and the difference input signal.

5. A non-transitory computer-readable medium comprising instructions for producing an audio output, the instructions, when executed by one or more processors, causing the one or more processors to:

receive, at the playback device, a first source stream of audio content;

determine whether the first stream of audio content is (i) standalone audio input comprising a left input channel signal and a right input channel signal or (ii) video-associated audio input having at least a left input channel signal, a right input channel signal, and a center input channel signal;

after determining that the first source stream of audio content is standalone audio content:

generate input signals based on the left and right channel signals, the input signals including (i) a sum input signal corresponding to a sum of the first and second channel signals, and (ii) a difference input signal corresponding to a difference of the left and right channel signals; and providing the sum input signal to a first plurality of spatial filters to generate first spatial filter output signals;

providing the difference input signal to a second plurality of spatial filters to generate second spatial filter output signals;

combining the first spatial filter output signals and the second spatial filter output signals to produce first arrayed audio output signals such that each of the first arrayed output signals is based on both at least one of the first spatial filter output signals and at least one of the second spatial filter output signals; and receive, at the playback device, a second source stream of audio content;

determine whether the second stream of audio content is (i) standalone audio input comprising a left input channel signal and a right input channel signal or (ii) video-associated audio input comprising a at least a left input channel signal, a right input channel signal, and a center input channel signal;

after determining that the second source stream of audio content is video-associated audio content including a left input channel signal, a right input channel signal, and a center input channel signal:

without generating sum or difference signals based on the left, right, and center input channel signals, apply a second array transfer function to the left, right, and center input channel signals to produce second arrayed audio output signals.

6. The non-transitory computer-readable medium of claim 5, further comprising providing individual audio output signals to each of (i) a first audio transducer on a first sound axis, (ii) a second audio transducer on a second sound axis, and (iii) a third audio transducer on a third sound axis, the playback device comprising the first, second, and third sound axes.

7. An audio signal processing system of a playback device, the system comprising: a processor; and tangible, non-transitory, computer-readable media storing instructions executable by the processor to cause the audio signal processing system to perform operations comprising:

receiving, at the playback device, a first source stream of audio content;

determining whether the first stream of audio content is (i) standalone audio content comprising a left input channel signal and a right input channel signal or (ii)

video-associated audio content comprising at least a left input channel signal, a right input channel signal, and a center input channel signal;

after determining that the first source stream of audio content is standalone audio content:

generating a sum input signal and a difference input signal, wherein the sum input signal is based on a sum of the left and right input channel signals and the difference input signal is based on a difference of the left and right input channel signals;

providing the sum input signal to a first plurality of spatial filters to generate first spatial filter output signals;

providing the difference input signal to a second plurality of spatial filters to generate second spatial filter output signals;

combining the first spatial filter output signals and the second spatial filter output signals to produce first arrayed audio output signals such that each of the first arrayed output signals is based on both at least one of the first spatial filter output signals and at least one of the second spatial filter output signals; and providing the first arrayed audio output signals to multiple audio transducers; and receiving, at the playback device, a second source stream of audio content; determining whether the first stream of audio content is (i) standalone audio content comprising a left input channel signal and a right input channel signal or (ii) video-associated audio content comprising at least a left input channel signal, a right input channel signal, and a center input channel signal;

after determining that the second source stream of audio content is video-associated audio content:

applying at least a second array transfer function to the left, right, and center input channel signals to produce second arrayed audio output signals; and providing the second arrayed audio output signals to multiple audio transducers.

8. The audio signal processing system of claim 7, wherein providing the second arrayed audio output signals comprises providing the second arrayed audio output signals to the plurality of audio transducers on three or more sound axes of the playback device.

9. The audio signal processing system of claim 7, wherein:

the second arrayed audio output signals include at least a first audio output signal, a second audio output signal, and a third audio output signal, the multiple audio transducers includes at least a first transducer, a second transducer, and a third transducer, and providing the second arrayed audio output signals includes— providing the first audio output signal to the first transducer on a first sound axis of the playback device, providing the second audio output signal to the second transducer on a first sound axis of the playback device, and providing the third audio output signal to a third transducer on a first sound axis of the playback device.

10. The audio signal processing system of claim 7, wherein a portion of the audio transducers are housed in a device different than the playback device.

11. The audio signal processing system of claim 7, wherein the first arrayed audio output signals include at least a first audio output signal and a second audio output signal, each of the first signal and the second signal including a portion of the first input signal and a portion of the second input signal.

12. The method of claim 1, further comprising:

applying a first spectral calibration adjustment to the first plurality of audio output signals before providing each of the first plurality of audio output signals to a respective one of the plurality of audio transducers; and applying a second spectral calibration adjustment to the second plurality of audio output signals before providing each of the second plurality of audio output signals to a respective one of the plurality of audio transducers, wherein the second spectral calibration adjustment is different from the first spectral calibration adjustment.

13. The computer-readable medium of claim 5, the operations further comprising:

applying a first spectral calibration adjustment to the first arrayed audio output signals; and applying a second spectral calibration adjustment to the second arrayed audio output signals, wherein the second spectral calibration adjustment is different from the first spectral calibration adjustment.

14. The audio signal processing system of claim 7, the operations further comprising:

applying a first spectral calibration adjustment to the first plurality of audio output signals before providing each of the first plurality of audio output signals to a respective one of the plurality of audio transducers; and applying a second spectral calibration adjustment to the second plurality of audio output signals before providing each of the second plurality of audio output signals to a respective one of the plurality of audio transducers, wherein the second spectral calibration adjustment is different from the first spectral calibration adjustment.

* * * * *